United States Patent [19]
Lee

[11] Patent Number: 5,550,443
[45] Date of Patent: Aug. 27, 1996

[54] AUTOMATIC BEAM CURRENT CONTROL CIRCUIT FOR MULTIMODE MONITOR AND METHOD THEREOF

[75] Inventor: Ji-Young Lee, Seoul, Rep. of Korea

[73] Assignee: SamSung Electronics Co., Ltd., Kyungki-do, Rep. of Korea

[21] Appl. No.: 519,280

[22] Filed: Aug. 25, 1995

[30] Foreign Application Priority Data

Aug. 25, 1994 [KR] Rep. of Korea ................ 21008/1994

[51] Int. Cl.⁶ ............................................... H01J 29/52
[52] U.S. Cl. .......................... 315/383; 348/327; 315/411
[58] Field of Search ................................... 315/411, 383; 348/327

[56] References Cited

U.S. PATENT DOCUMENTS

| | | |
|---|---|---|
| 4,295,166 | 10/1981 | Shanley, II et al. |
| 4,330,792 | 5/1982 | Naimpally. |
| 4,568,861 | 2/1986 | Doran et al. |
| 4,885,510 | 12/1989 | Matthews. |
| 4,902,940 | 2/1990 | Herbert. |
| 5,231,496 | 7/1993 | Tokui. |

*Primary Examiner*—Theodore M. Blum
*Attorney, Agent, or Firm*—Robert E. Bushnell, Esq.

[57] ABSTRACT

An automatic beam current control circuit for a multimode monitor provides a high voltage circuit for regulating its output voltage according to a video signal being applied to a cathode ray tube, a luminance data compensator having an analog-to-digital (A/D) conversion port for receiving the output voltage of a feedback signal from the high voltage circuit and using a microprocessor to compare data converted by the analog-to-digital (A/D) conversion port with reference luminance data stored in a memory to thereby output an automatic beam current control value, and an automatic beam current controller for receiving the automatic beam current control value and automatically adjusting beam current provided to the cathode ray tube. A method for automatically controlling beam current in the multimode monitor includes the steps of performing mode detection by checking the horizontal or vertical synchronization signal of the multimode monitor, reading the preset luminance data for the relevant operational mode from the memory, reading present luminance data from the high voltage circuit, and performing luminance data compensation by comparing the preset luminance data and the present luminance data, adjusting the present luminance data to equal the preset luminance data, and automatically outputting the compensated present luminance data to the automatic beam current controller.

4 Claims, 3 Drawing Sheets

AUTOMATIC BEAM CURRENT CONTROL CIRCUIT FOR MULTIMODE MONITOR AND METHOD THEREOF

CROSS-REFERENCE TO RELATED APPLICATIONS

This application makes reference to, incorporates the same herein, and claims all benefits accruing under 35 U.S.C. §119 from an application for *Automatic Beam Current Control Circuit For Multimode Monitor And Method Thereof* earlier filed in the Korean Industrial Property Office on 25 Aug. 1994 and assigned Serial No. 21008/1994.

BACKGROUND OF THE INVENTION

The present invention relates to an automatic beam current control circuit and method for a multimode monitor, and more particularly, to an automatic beam current control circuit and method for a monitor operating in multiple modes whereby the beam current of a respective mode having a specific operating frequency is precisely adjusted by using a microprocessor coupled to receive a feedback voltage signal from a high voltage circuit.

Conventionally, beam current control circuits perform a beam current adjustment operation for monitors employing only a single mode of operation (i.e., having a single inherent operating frequency). Therefore, in a multimode monitor having multiple modes using a plurality of different operating frequencies, it is necessary to provide automatic beam current control for a variety of different frequency levels.

SUMMARY OF THE INVENTION

Accordingly, it is an object of the present invention to provide an improved beam current control circuit and method for a monitor.

It is another object to provide an automatic beam current control circuit and method for a multimode monitor wherein beam current of a respective mode having an inherent operating frequency is individually adjusted by a microprocessor to stabilize the luminance signal at each mode.

To achieve these and other objects, there is provided an automatic beam current control circuit for a multimode monitor including a high voltage circuit for regulating its output voltage according to a video signal being applied to a cathode ray tube, a luminance data compensator having an analog-to-digital (A/D) conversion port for receiving the output voltage of a feedback signal from the high voltage circuit and using a microprocessor to compare data converted by the analog-to-digital (A/D) conversion port with reference luminance data stored in a memory to thereby output an automatic beam current control value, and an automatic beam current controller for receiving the automatic beam current control value and automatically adjusting beam current provided to the cathode ray tube.

To further achieve the above objects of the present invention, there is provided a method for automatically controlling beam current in a multimode monitor comprising the steps of performing mode detection by checking the horizontal or vertical synchronization signal of the multimode monitor, reading the preset luminance data for the relevant operational mode from a memory, reading present luminance data from a high voltage circuit, and performing luminance data compensation by comparing the preset luminance data and the present luminance data, adjusting the present luminance data to equal the preset luminance data, and automatically outputting the compensated present luminance data to an automatic beam current controller.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
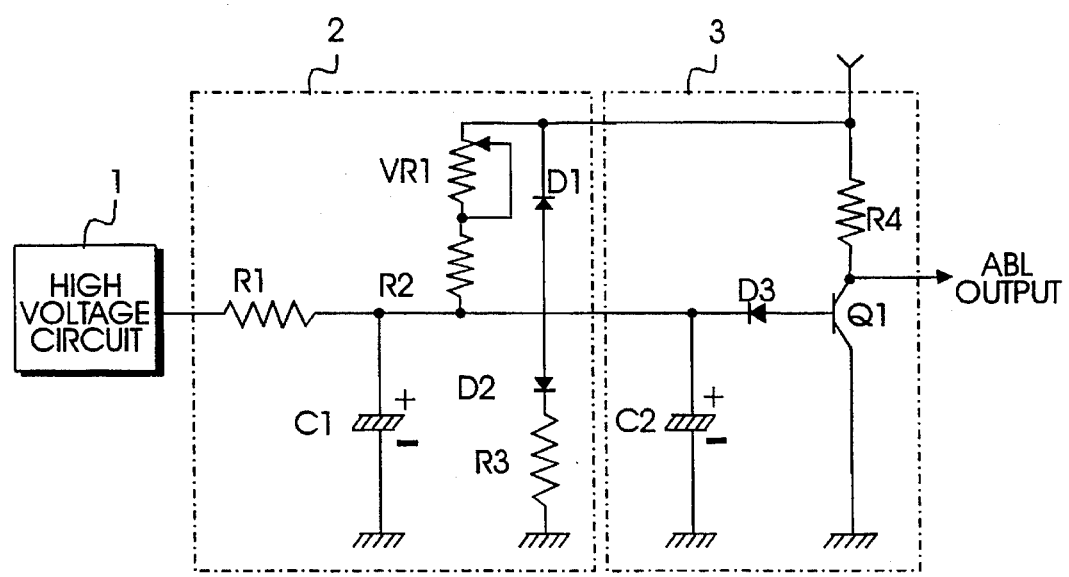
FIG. 1 is a diagram of a conventional automatic beam current control circuit.

Turning now to the drawings and referring to FIG. 1, a diagram of a conventional automatic beam current control circuit is shown. The circuit of FIG. 1 includes a high voltage circuit 1 which varies its output voltage according to a video signal applied to a cathode ray tube, a voltage detector 2 for detecting the output voltage of a feedback signal from high voltage circuit 1, and a beam current controller 3 for adjusting a luminance compensating current to an automatic beam current load (ABL) corresponding to the detected voltage level.

Voltage detector 2 is composed of a combination of resistors R1, R2, and a smoothing capacitor C1 for detecting the output voltage of high voltage circuit 1, a variable resistor VR1 for varying the reference level of the detected voltage, and a combination of diodes D1, D2 and a resistor R3 for shaping the detected voltage.

Beam current controller 3 is composed of a smoothing capacitor C2, a diode D3 and a transistor Q1 which are driven when the detected voltage level is low for adjusting the auto beam current load (ABL).

An automatic beam current control operation in a monitor having a circuit configuration, such as in FIG. 1, is usually adjusted in the factory to 30 fL (i.e., footlamberts) for a full-white screen. A footlambert is a unit of luminance equal to $1/\pi$ candelas per square foot or $10.7639/\pi$ candelas per square meter. In conventional art, such as described above, a single predetermined mode is set such that, when a multimode monitor is involved, the predetermined mode having a given beam current can potentially cause incompatibility problems.

In FIG. 1, once the beam current corresponding to a full-white screen is increased, high voltage circuit 1 decreases its output voltage. Voltage detector 2 detects the output voltage of high voltage circuit 1 and accordingly decreases its output voltage. As a result, diode D3 and transistor Q1 of beam current controller 3 are driven in turn, the emitter output is reduced, and the beam current in automatic beam current load is accordingly controlled.

The above described adjustment operation is performed at a predetermined mode (i.e., at a mode having an inherent operating frequency). Therefore, in a multimode monitor having multiple modes using operating frequencies of 30 KHz, 60 KHz and 80KHz, respectively, for example, it is necessary to provide a variety of different levels for the automatic beam current control output.

Figure 2:
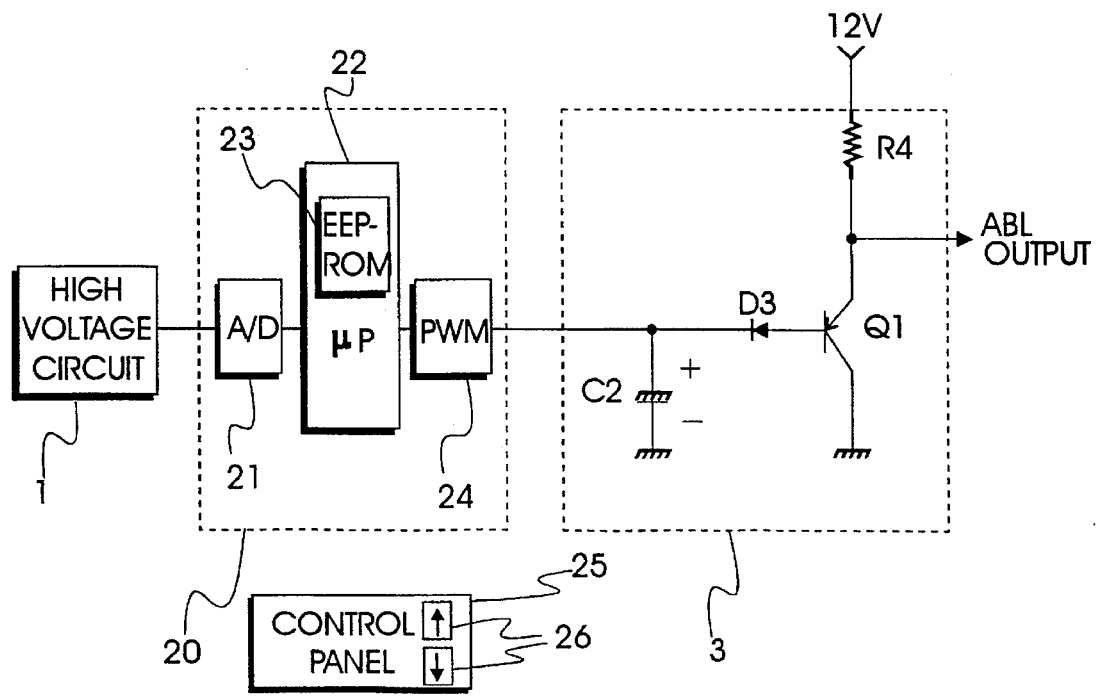
FIG. 2 is a diagram of an automatic beam current control circuit constructed according to the principles of the present invention.

Referring to FIG. 2, a diagram of an automatic beam current control circuit constructed according to the principles of the present invention is shown. The circuit of FIG. 2 includes a high voltage circuit 1 for regulating its output voltage according to the degree of luminance in a video signal being applied to a cathode ray tube (CRT). A luminance data compensator 20 has an analog-to-digital (A/D) conversion port 21 for receiving the output voltage of a feedback signal from high voltage circuit 1, and is coupled to an automatic beam current controller 3 for automatically adjusting beam current provided to the cathode ray tube (CRT) corresponding to the level of the output voltage. Luminance data compensator 20 then uses a microprocessor 22 to compare data converted by analog-to-digital (A/D) conversion port 21 with reference luminance data stored in an electrically erasable and programmable read only memory (EEPROM) 23 to thereby output an automatic beam current control value via a pulse width modulation (PWM) output port 24.

Figure 3:
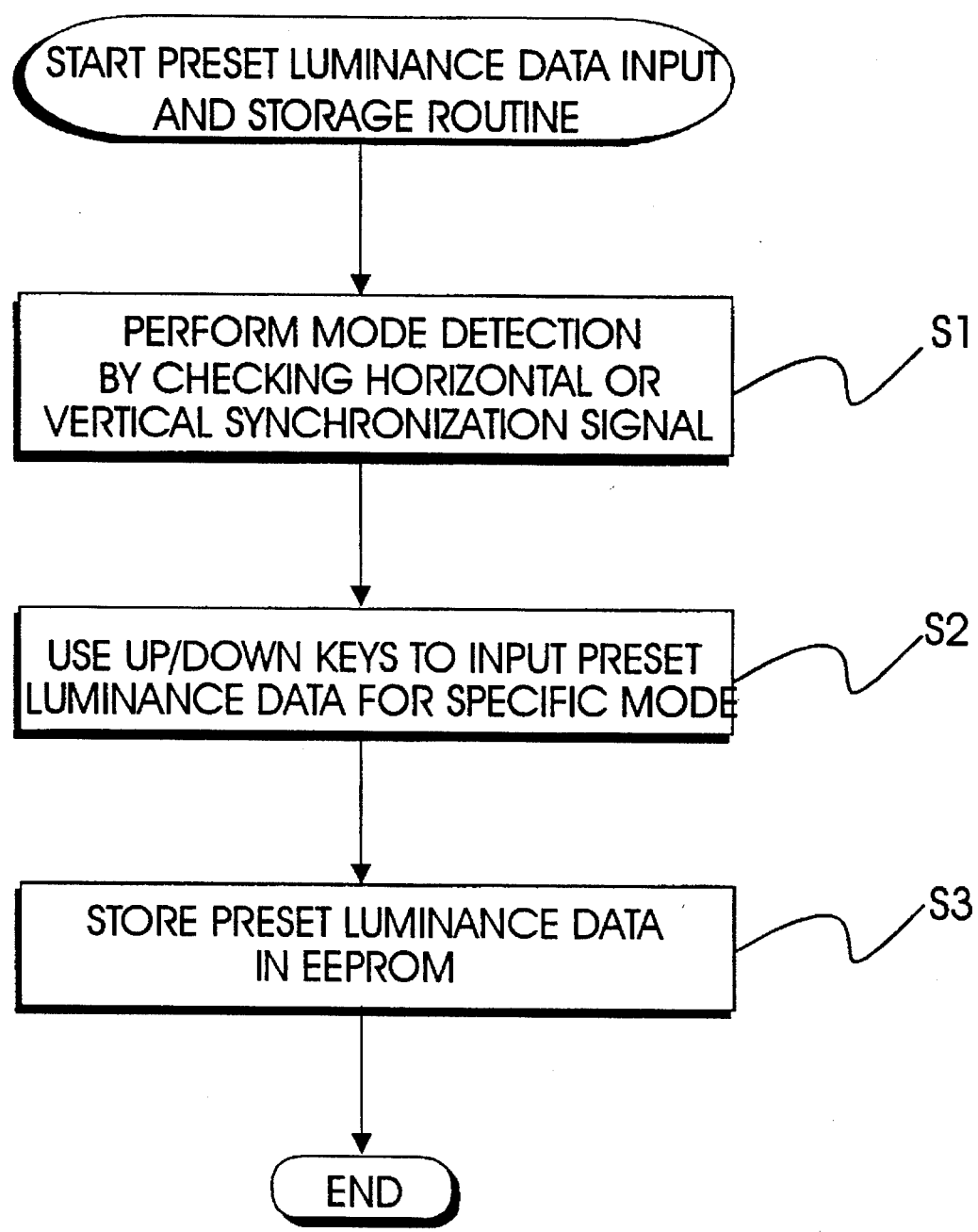
FIG. 3 is a flow chart illustrating input and storage of reference values for preset luminance data for effectuating the method of automatically controlling beam current according to the principles of the present invention.

A preset procedure for effectuating the above embodiment of the present invention is disclosed in FIG. 3. FIG. 3 is a flow chart showing a routine for inputting preset luminance data reference values and storing the individual luminance data reference values according to respective modes in the electrically erasable and programmable read only memory (EEPROM) 23 of microprocessor 22.

The procedure of FIG. 3 comprises the steps of: performing mode detection by checking the horizontal or vertical synchronizing signal (step S1), using UP/DOWN keys 26 disposed on a control panel 25 to enter preset data so that the degree of luminance for a full-white screen at a respective mode equals 30 fL (step S2), and storing the preset luminance data in the electrically erasable and programmable read only memory (EEPROM) 23.

Figure 4:
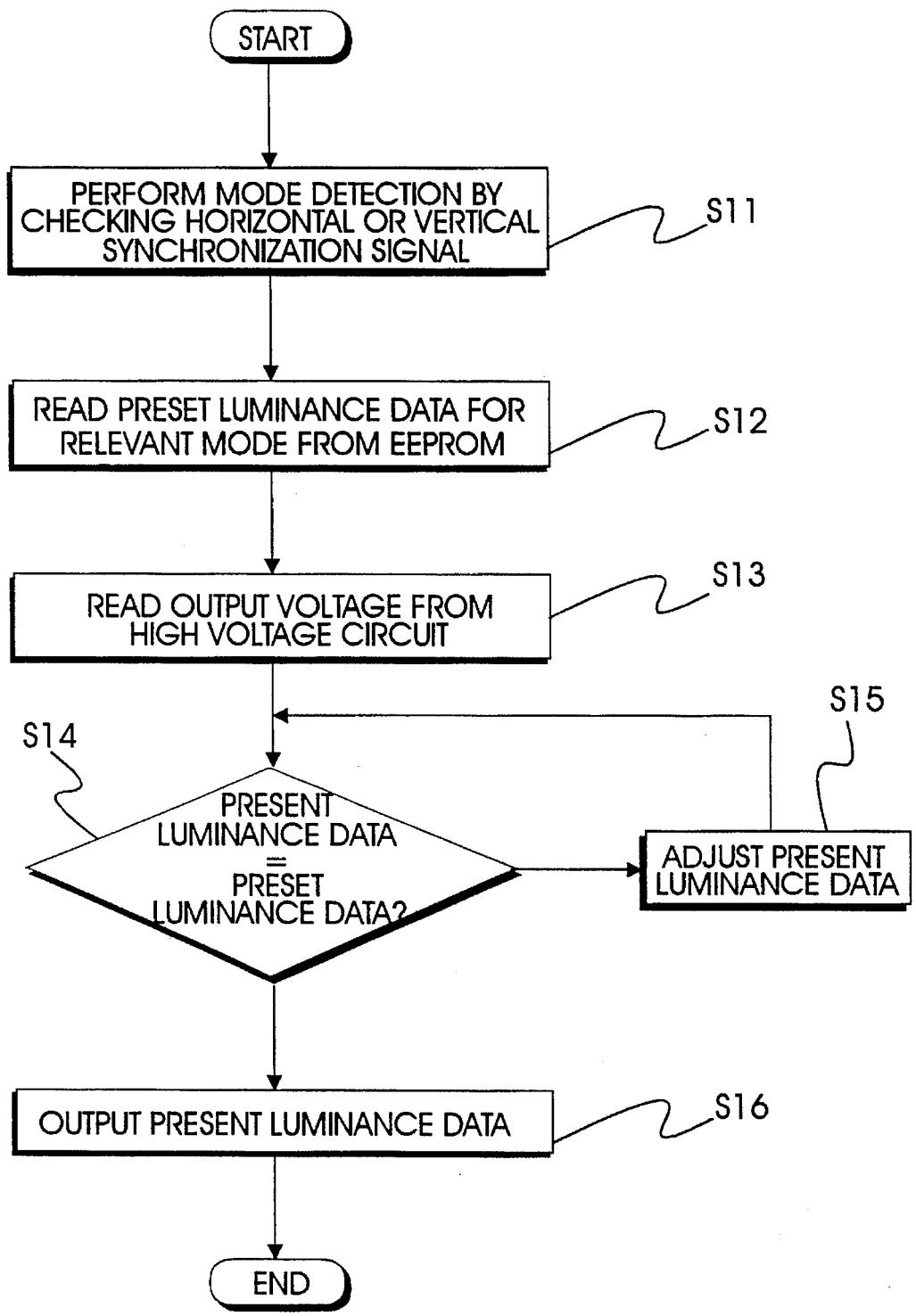
FIG. 4 is a flow chart illustrating the sequence of automatically controlling beam current according to the principles of the present invention.

Referring to FIG. 4, a flow chart illustrating the sequence of automatically controlling beam current according to the principles of the present invention is shown. FIG. 4 includes the steps of: performing mode detection by checking the horizontal or vertical synchronization signal of the multimode monitor (step S11), reading the preset luminance data for the relevant operational mode from electrically erasable and programmable read only memory (EEPROM) 23 (step S12), reading the output voltage of the feedback signal (i.e., present luminance data) from high voltage circuit 1 (step S13), and performing luminance data compensation by comparing the preset luminance data and the present luminance data, adjusting the present luminance data to equal the preset luminance data, and automatically outputting the compensated present luminance data to automatic beam current controller 3 via pulse width modulation (PWM) port 24 (steps S14–S16).

The above stated luminance data compensation steps preferably include the steps of: comparing the present luminance data that is currently being input and the preset luminance data for the relevant mode (step S14), increasing or decreasing the value of the present luminance data until the present luminance data is equal to the preset luminance data under the automatic control of microprocessor 22 (step S15), and outputting the compensated present luminance data at pulse width modulation (PWM) port 24 when the two data values are equal (step S16). Alternatively, the luminance data compensation procedure can be performed by simply outputting the preset luminance data corresponding to the pertinent mode, rather than adjusting the present luminance data.

Now, by way of a non-limiting example, a preferred embodiment of the present invention will be described in greater detail.

Referring to FIG. 3, luminance data compensator 20, which includes microprocessor 22, receives and checks horizontal and vertical synchronization signals to determine the mode being adopted in the multimode monitor (step S1). UP/DOWN keys 26 on control panel 25 are manipulated by a user to input preset luminance data so that a full-white screen corresponds to 30 fL for the relevant mode (step S2). The preset luminance data is then stored in electrically erasable and programmable read only memory (EEPROM) 23 for the relevant mode.

Referring now to FIG. 4, when the output voltage of the feedback signal from high voltage circuit 1 is applied to analog-to-digital (A/D) conversion port 21 of luminance data compensator 20, microprocessor 22 checks the horizontal and vertical synchronization signals output from the multimode monitor to determine the mode currently being employed (step S11), microprocessor 22 then reads the preset luminance data for the mode currently being employed from electrically erasable and programmable read only memory (EEPROM) 23. This preset luminance data was input and stored as depicted in FIG. 3.

Thereafter, microprocessor 22 receives the output voltage of the feedback signal from high voltage circuit 1 via analog-to-digital (A/D) conversion port 21 (step S13). This input to microprocessor 22 represents the present luminance data. Microprocessor 22 then compares the present luminance data with the preset luminance data (step S14).

When the present luminance data is not equal to the preset luminance data, microprocessor 22 automatically increases or decreases the present luminance data (step S15) and repeats the above described comparison (step 14). When the present luminance data is equal to the preset luminance data, microprocessor 22 then outputs the compensated present luminance data to beam current controller 3 via pulse width modulation (PWM) port 24 (step S16), thereby completing the compensating operation for the relevant mode. This operation can be performed for each mode provided by the multimode monitor.

As stated above, according to the automatic beam control circuit and method for the multimode monitor of the present invention, a feedback signal from a high voltage circuit is coupled to an analog-to-digital (A/D) conversion port connected to a microprocessor having an electrically erasable and programmable read only memory (EEPROM) that stores preset luminance data of respective modes of the monitor. Accordingly, the present invention prevents possible damage to the cathode ray tube (CRT) and provides convenient use.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for automatically controlling a beam current in a multimode monitor, said circuit comprising:
   a high voltage circuit for providing an output voltage having a magnitude representative of a degree of luminance in a video signal applied to a cathode ray tube of said multimode monitor; and
   a luminance data compensator for receiving said output voltage from said high voltage circuit, determining a mode of operation currently being employed by said multimode monitor, reading preset luminance data from a memory means, comparing said preset luminance data with present luminance data represented by said output voltage, generating compensated luminance data by adjusting said present luminance data to equal said preset luminance data, and outputting said compensated luminance data to control said beam current.

2. A method for automatically controlling a beam current in a multimode monitor, said method comprising the steps of:
   checking one of a horizontal synchronizing signal and a vertical synchronizing signal being applied to said multimode monitor to determine a mode of operation currently being employed by said multimode monitor;
   reading preset luminance data corresponding to said mode of operation currently being employed by said multimode monitor;
   receiving a voltage having a magnitude representative of a degree of luminance in a video signal being applied to said multimode monitor; and
   comparing said preset luminance with present luminance data represented by said voltage;
   generating compensated luminance data by adjusting said present luminance data; and
   controlling said beam current in dependence upon said compensated luminance data.

3. The method of claim 2, wherein said step of generating said compensated luminance data is performed by adjusting said present luminance data to equal said preset luminance data.

4. The method of claim 2, further comprising a step of entering and storing said preset luminance data corresponding to said mode of operation currently being employed by said multimode monitor by manipulating keys on a control panel corresponding to said multimode monitor.

* * * * *